United States Patent
Dain (10) Patent No.: US 10,552,059 B2
(45) Date of Patent: Feb. 4, 2020

(54) DATA MIGRATION WITH PLACEMENT BASED ON ACCESS PATTERNS

(71) Applicant: International Business Machines Corporation, Armonk, NY (US)

(72) Inventor: Joseph W. Dain, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 15/417,687

(22) Filed: Jan. 27, 2017

(65) Prior Publication Data
US 2018/0217762 A1    Aug. 2, 2018

(51) Int. Cl.
  *G06F 3/06* (2006.01)
(52) U.S. Cl.
  CPC ............ *G06F 3/0619* (2013.01); *G06F 3/065* (2013.01); *G06F 3/067* (2013.01)
(58) Field of Classification Search
  CPC ......... G06F 3/0619; G06F 3/065; G06F 3/067
  See application file for complete search history.

(56) References Cited

U.S. PATENT DOCUMENTS

| | | | |
|---|---|---|---|
| 7,693,877 B1 | 4/2010 | Zasman | |
| 8,032,490 B2 | 10/2011 | Tanaka et al. | |
| 8,583,838 B1* | 11/2013 | Marshak | G06F 3/061 710/16 |
| 8,972,978 B2 | 3/2015 | Astete et al. | |
| 9,286,173 B2 | 3/2016 | Nolterieke et al. | |
| 9,665,630 B1 | 5/2017 | Bigman et al. | |
| 9,671,977 B2 | 6/2017 | Olson et al. | |
| 9,703,500 B2* | 7/2017 | Fiske | G06F 3/0625 |
| 9,798,465 B1 | 10/2017 | Labaj et al. | |
| 9,916,097 B1* | 3/2018 | Martin | G06F 3/061 |
| 2009/0228589 A1 | 9/2009 | Korupolu | |
| 2011/0010514 A1 | 1/2011 | Benhase et al. | |
| 2011/0106863 A1* | 5/2011 | Mamidi | G06F 16/185 707/823 |
| 2011/0185120 A1 | 7/2011 | Jess | |
| 2013/0219144 A1* | 8/2013 | Oe | G06F 12/02 711/165 |
| 2013/0297872 A1 | 11/2013 | Hyde, II et al. | |
| 2014/0281260 A1* | 9/2014 | Peterson | G06F 3/0616 711/135 |
| 2016/0124678 A1 | 5/2016 | Hasegawa et al. | |

(Continued)

OTHER PUBLICATIONS

Dain et al., "Data Migration With Placement Based on Access Patterns", U.S. Appl. No. 15/801,421, filed Nov. 2, 2017, 27 pages.

(Continued)

*Primary Examiner* — Tracy A Warren
(74) *Attorney, Agent, or Firm* — James H. Mayfield; Arnold B. Bangali (57) ABSTRACT

A method, executed by a computer, includes determining an access metric, an input/output operations per second (IOPs) metric, and a size metric for each data target of a plurality of data targets, ranking the plurality of data targets according to the access metric of each data target, assigning each data target to a storage pool of a plurality of storage pools according to the IOPs metric and the size metric of the data target. A computer system and computer program product corresponding to the above method are also disclosed herein.

14 Claims, 6 Drawing Sheets

(56) References Cited

U.S. PATENT DOCUMENTS

2016/0266799 A1    9/2016    Patel et al.
2017/0024161 A1    1/2017    Katiyar et al.
2017/0116082 A1    4/2017    Volvovski et al.

OTHER PUBLICATIONS

IBM Appendix P, list of patents and patent applications treated as related, filed herewith, 2 pages.

Dasgupta et al., "QoSMig: Adaptive Rate-Controlled Migration of Bulk Data in Storage Systems", Proceedings of the 21st International Conference on Data Engineering (ICDE 2005), © 2005 IEEE, 12 pages.

Eshel et al., "Panache: A Parallel File System Cache for Global File Access", IBM Almaden Research, printed on Dec. 5, 2016, 14 pages.

K.R. et al., "VENU: Orchestrating SSDs in Hadoop Storage", 2014 IEEE International Conference on Big Data, © 2014 IEEE, 6 pages.

Li et al., "Managing Data Retention Policies at Scale", HP Laboratories, HPL-2010-263, © Copyright IFIP/IEEE International Symposium on Integrated Network Management 2011, 9 pages.

Zhang et al., "Automated Lookahead Data Migration in SSD-enabled Multi-tiered Storage Systems", © 2010 IEEE, 6 pages.

"CIFS file and folder access events that can be audited", Copyright © 1994-2013, NetApp, Inc., Part No. 215-07968-AO, May 2013, 2 pages, <https://library.netapp.com/ecmdocs/ECMP1196891/html/GUID-B58B96B2-2147-4AC9-92FF-3F9DB577DF00.html>.

"Distributed Management Task Force, Inc.", CADF | DMTF, Copyright © 2016 DMTF, 3 pages, <https://www.dmtf.org/standards/cadf>.

"Infinite io", © 2016 infinite io Inc., 11 pages, <http://infiniteio.com/>.

"CIFS file and folder access events that can be audited", Copyright © 1994-2013, NetApp, Inc., Part No. 215-07968-AO, May 2013, 1 page, <https://library.netapp.com/ecmdocs/ECMP1196891/html/GUID-52EC528A-5AC6-492A-B63D-17DDDA4AC109.html>.

* cited by examiner

| STORAGE POOL | SIZE | IOPs | SIZE THRESHOLD | IOPs THRESHOLD |
|---|---|---|---|---|
| PLATINUM | 200 MB | 2000 | 65% (130 MB) | 50% (1000) |
| GOLD | 500 MB | 200 | 50% (250 MB) | 50% (100) |
| SILVER | 1 GB | 100 | 50% (500 MB) | 50% (50) |
| BRONZE | 1 TB | N/A | N/A | N/A |

FIG. 5

| TARGET NAME | ACCESSES | IOPs | SIZE | STORAGE POOL |
|---|---|---|---|---|
| File1 | 6000 | 100 | 100 MB | PLATINUM |
| File2 | 4500 | 75 | 4 KB | PLATINUM |
| File3 | 4200 | 70 | 4 KB | PLATINUM |
| File4 | 4080 | 68 | 200 MB | GOLD |
| File5 | 3600 | 60 | 5 MB | SILVER |
| File6 | 600 | 10 | 75 MB | SILVER |
| File7 | 600 | 10 | 35 MB | SILVER |
| File8 | 240 | 4 | 500 MB | BRONZE |
| File9 | 180 | 3 | 1 GB | BRONZE |
| File10 | 180 | 3 | 500 MB | BRONZE |

FIG. 6

FIG. 7

DATA MIGRATION WITH PLACEMENT BASED ON ACCESS PATTERNS

BACKGROUND OF THE INVENTION

The present invention relates generally to the migration of data, and more specifically, to the intelligent placement of data during migration based on access patterns.

In the field of data migration, source and destination systems may have different storage tiers and file placement policies for those tiers. For example, a source system may have storage tiers such as flash, disk, tape, and external cloud tiers, whereas a destination system may only have tape storage. During a migration, data may be moved multiple times: first, data may be moved from the source system to the destination system, and then, the data may be rearranged across the various storage tiers of the destination system in an effort to optimize its placement. Thus, data migration can be made more efficient by optimizing the initial placement of data on a destination system's storage tiers.

SUMMARY

As disclosed herein, a method, executed by a computer, includes determining an access metric, an input/output operations per second (IOPs) metric, and a size metric for each data target of a plurality of data targets, ranking the plurality of data targets according to the access metric of each data target, assigning each data target to a storage pool of a plurality of storage pools according to the IOPs metric and the size metric of the data target. A computer system and computer program product corresponding to the above method are also disclosed herein.

DETAILED DESCRIPTION

Embodiments of the present invention relate generally to the migration of data, and more specifically, to the intelligent placement of data during migration based on the data's access patterns. By analyzing access patterns of data, individual data files or objects can be classified as "hotter" or "colder" than other files based on their relative access frequencies. For example, a file that is accessed four times per hour is hotter than a file on the same system that was only accessed once per hour.

By analyzing the audit logs of data being migrated, it is possible to determine, in terms of how hot or cold the data is, where to place data on the destination system. In particular, hotter data may be placed on a "hot" storage pool (such as flash or disk), and colder data may be placed on a "cold" storage pool such as tape. Thus, data files/objects can be migrated directly to the correct storage tier of a target system, thereby eliminating intermediate data movements. Furthermore, embodiments of the present invention use audit logs to discern the heat information about the source data, and thus do not require the addition of a network device in the data migration path.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
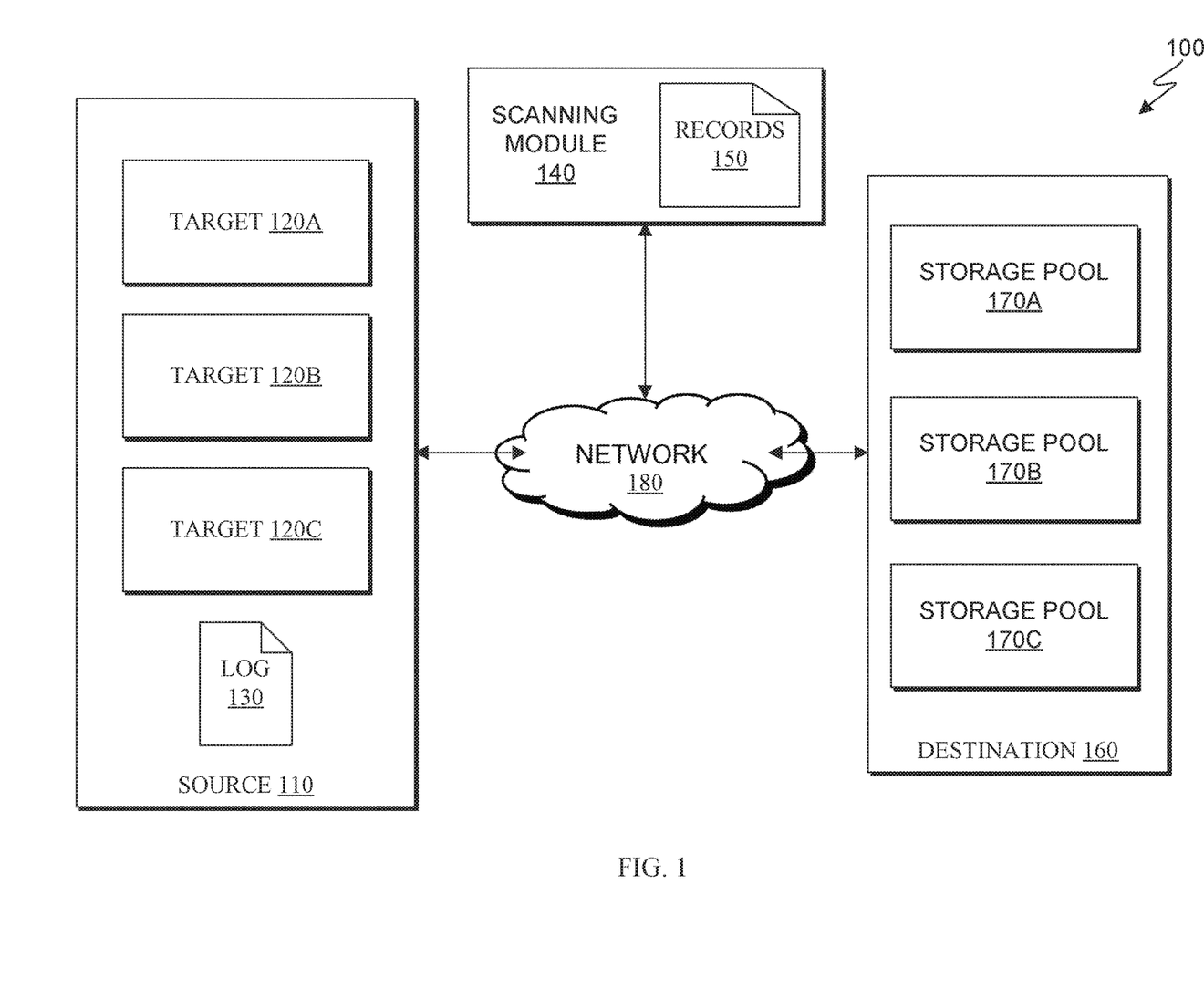
FIG. 1 is a block diagram depicting an example of a migration environment in accordance with embodiments of the present invention.

FIG. 1 is a block diagram depicting an example of a migration environment 100 in accordance with embodiments of the present invention. As depicted, migration environment 100 includes source 110 with targets 120A-120C and audit log 130, scanning module 140, target records 150, destination 160, and storage pools 170A-170C. Migration environment 100 enables the migration of targets 120A-120C from source 110 to destination 160, where the targets are intelligently placed on storage pools 170A-170C.

Source 110 may be any system that stores data. Source 110 may include one or more of any non-volatile storage media known in the art. For example, source 110 can be implemented with a tape library, optical library, one or more independent hard disk drives, or multiple hard disk drives in a redundant array of independent disks (RAID). Similarly, data on source 110 may conform to any suitable storage architecture known in the art, such as a file, a relational database, an object-oriented database, and/or one or more tables.

Targets 120A-120C may refer to data stored on source 110. Targets 120A-120C may include files, directories, objects, containers, or combination thereof; each target specifically refers to either a file, director, object, and/or container stored on source 110. Targets 120A-120C are any file, directory, object, or container that is targeted for migration from source 110 to destination 160. Three targets 120A-120C are shown for exemplary purposes; there may be greater or fewer targets on source 110. Targets 120A-120C may be stored together in a single storage pool on source 110, or across multiple storage pools.

Audit log 130 may include any log containing records of the access frequency of targets 120A-120C. Audit log 130 may record the time at which any read or write operations interacted with a specific target. For example, audit log 130 may have a record of target 120A being accessed three times, target 120B being accessed once, and target 120C not being accessed at all over a particular time span. In some embodiments, audit log 130 is routinely generated or updated by source 110 whenever a target is created, written to, or read from.

Scanning module 140 may analyze and determine the access frequencies of targets 120A-120C and generate/maintain target records 150. In some embodiments, scanning module 140 performs target access counting method 200 (see below). Scanning module 140 may analyze audit log 130 in order to determine the relative access frequencies of targets 120A-120C. Scanning module 140 may output its analysis as target records 150. Scanning module 140 may also receive storage pool information from destination 160, including the storage size, input/output operations per second (IOPs), and configuration information of each storage pool. In some embodiments, scanning module 140 assigns each target in target records 150 to a particular storage pool.

Target records 150 may be a list of records that is created and maintained by scanning module 140. Target records 150 may track each target, along with the number of access events of a target, the IOPs associated with a target, and the data size of a target. In some embodiments, target records 150 is updated by scanning module 140 to indicate the storage pool on destination 160 to which a target is assigned.

Destination 160 may be any system that stores data, similar to source 110. Destination 160 may include one or more storage pools that act as the ultimate storage destination of targets 120A-120C that are being migrated. During a migration, targets 120A-120C are moved from source 110 to destination 160. Destination may also receive instructions regarding which storage pool to place targets.

Storage pools 170A-170C may represent the tiered storage destination for migrated targets. For example, storage pool 170A may be a "gold" performance tier that is capable of high IOPs (such as flash memory), and is ideal for hotter files that are accessed more frequently. Storage pool 170B may be an intermediate tier, and may utilize disk storage. Storage pool 170C may be a lower performance tier that is suited for colder files, and may include tape storage. Thus, each storage pool 170A-170C may correlate to a particular tier upon which data may be stored according to its size and frequency-of-access requirements. While three storage pools 170A-170C are depicted for exemplary purposes, destination 160 may have any number of storage pools, each representing a particular performance tier of storage. The performance specifications of each storage pool 170A-170C may be configurable by a user and/or derived from hardware specifications of the physical storage media therein.

Network 180 can be, for example, a local area network (LAN), a wide area network (WAN) such as the Internet, or a combination of the two, and include wired, wireless, or fiber optic connections. In general, network 180 can be any combination of connections and protocols that will support communications between source 110, scanning module 140, and/or destination 160 in accordance with an embodiment of the present invention.

Figure 2:
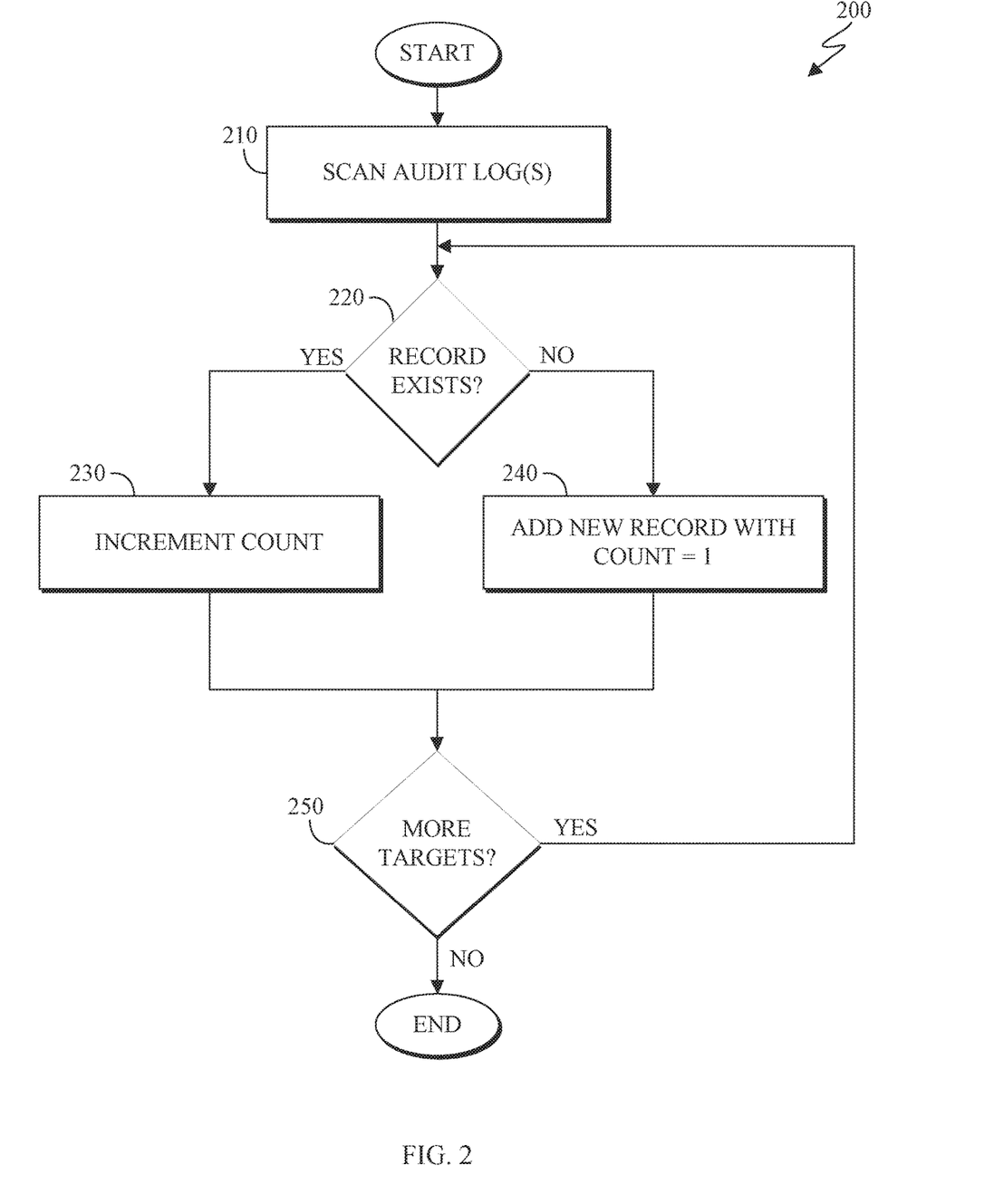
FIG. 2 is a flow chart depicting an example of a target access analysis method in accordance with embodiments of the present invention.

FIG. 2 is a flow chart depicting an example of a target access counting method 200 in accordance with embodiments of the present invention. As depicted, target access counting method 200 includes scanning (210) an audit log, determining (220) whether a record exists, incrementing (230) the count, adding (240) a new record, and determining (250) whether there are additional targets. Target access counting method 200 analyzes audit log 130 to determine the relative access frequencies of data targets on source 110.

Scanning (210) the audit log may include using scanning module 140 to scan through entries on audit log 130 regarding targets 120A-120C. Each entry may contain a data target (either a file, directory, object, or container) along with a timestamp of when it was accessed.

Determining (220) whether a record exists includes determining whether scanning module 140 has a record for an entry in audit log 130. Thus, scanning module 140 may check to see if there is a record for each target that is listed in audit log 130. In some embodiments, scanning module 140 stores records in target records 150. If scanning module 140 determines that there is already a record in target records 150 for an entry in audit log 130, then target access counting method 200 may proceed to incrementing (230) the count; if there is not a record, then target access counting method 200 may proceed to adding (240) a new record.

Incrementing (230) the count may include incrementing a count associated with a target in target records 150. Scanning module 140 may increment the count every time the access of a target is listed in audit log 130, so the count may correspond to the number of access events of a target. Adding (240) a new record to target records 150 occurs if there is not already a record corresponding to a target. When a new record is created, the count may be set to one.

Determining (250) whether there are additional targets may include proceeding to scan audit log 130 to determine if more target access events are listed. If there are no more target access events, then target access counting method 200 may terminate; if additional target access events exist, then method 200 loops back to determining (220) whether a record exists for that target. In this manner, target access counting method 200 processes audit log 130, one entry at a time, counting the number of access events of each target, and storing the count as an entry in target records 150.

Figure 3:
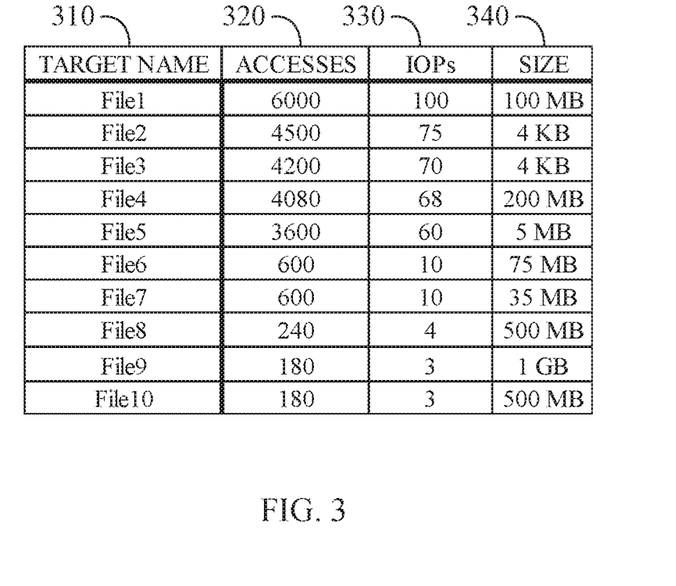
FIG. 3 is a table depicting an example of target records in accordance with embodiments of the present invention.

FIG. 3 is a table depicting an example of a target records 300 in accordance with embodiments of the present invention. Target records 300 may include a list of target names 310, along with number of accesses 320, input/output operations per second 330, and size 340 of each target. Target records 300 may be an example of the output of scanning module 140 according to target access counting method 200.

Target names 310 may include a listing of each target, such as targets 130A-130C, that appears in audit log 130 and/or is processed by scanning module 140. Number of accesses 320 may correspond to the number of times that the corresponding target was accessed, as determined by target access counting method 200. Input/output operations per second (IOPs) 330 may be calculated by dividing the number of accesses of a particular target by the amount of time over which audit log 130 captured data, converted to operations per second. Thus, IOPs 330 represents a normalized number of input/output operations. Size 340 may include the size of the target as measured in units of digital information such as bytes.

After scanning module 140 creates target records 300, target records 300 may be sorted first according to the number of accesses 320 (and thus, IOPs 330) in descending order. Target records 300 may further be sorted by size 340 in descending order. For example, in the depicted example, File6 and File7 are tied for number of accesses, so they are further sorted descendingly by size.

Figure 4:
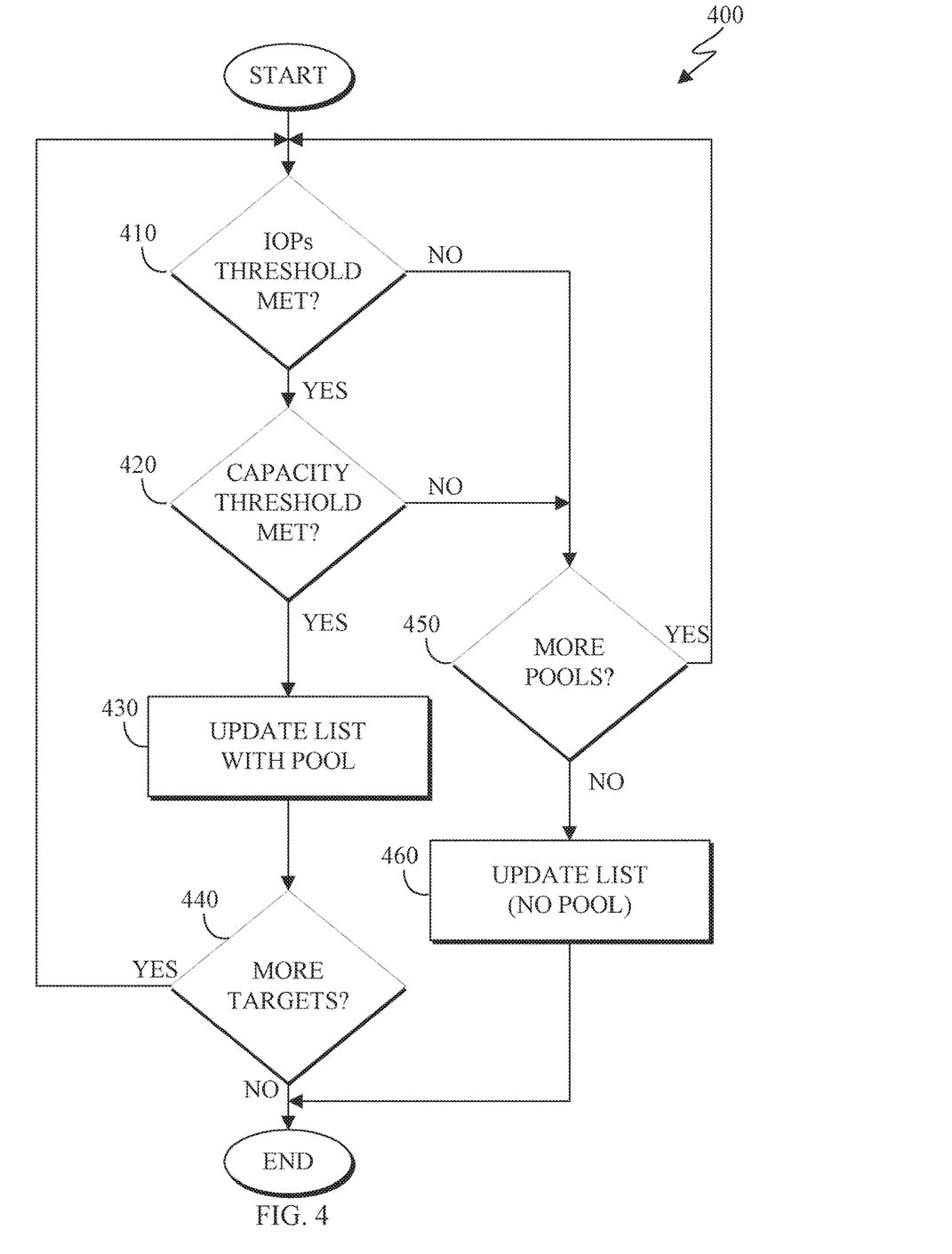
FIG. 4 is a flow chart depicting an example of a target placement method in accordance with embodiments of the present invention.

FIG. 4 is a flow chart depicting an example of a target placement method 400 in accordance with embodiments of the present invention. As depicted, target placement method 400 includes determining (410) whether IOPs threshold is met, determining (420) whether capacity threshold is met, updating (430) the list with pool assignment, determining (440) whether there are more targets, determining (450) whether there are more pools, and updating (460) the list with no pool assignment. Target placement method 400 takes into account the IOPs and size of each target and assigns it to a proper storage pool based on the storage pool's specifications. Target placement method 400 assigns targets to storage pools by processing target records 300 in a descending order, and attempting to pair each target with the highest-rated pool that is available.

Determining (410) whether the IOPs threshold is met may include comparing the IOPs 330 of a target to the IOPs threshold of a storage pool. The IOPs threshold of a storage pool may be some predetermined fraction of the maximum IOPs for which it is rated or capable. In some embodiments, determination operation 410 takes into account the IOPs for a storage pool that is already consumed, and factor that into the IOPs or IOPs threshold that is available for the target currently being placed by target placement method 400. If it is determined that the IOPs of the target meets the IOPs threshold, target placement method 400 proceeds to determination operation 420. If not, method 400 proceeds to operation 450.

Determining (420) whether the storage capacity threshold is met may include comparing the size 340 of a target to the storage capacity threshold of a storage pool. The storage capacity threshold of a storage pool may be some predetermined fraction of the maximum storage volume of the pool. In some embodiments, determination operation 420 takes into account the storage consumed by other targets placed on a storage pool, and factor that into the storage capacity or storage capacity threshold that is available for the target currently being placed by target placement method 400. In some embodiments, target placement method 400 bypasses the IOPs and storage threshold and instead uses the full IOPs and storage that is available. If it is determined that the size of the target meets the storage threshold, target placement method 400 proceeds to updating operation 430. If not, method 400 proceeds to operation 450.

Updating (430) the list with a pool assignment may include updating a target's records with its pool assignment, which is the storage pool that the target's requirements were compared against in determination operations 410 and 420. In some embodiments, the pool assignment is added to target records 300. Once targets are assigned correct pools, migration may take place from source 110 to destination 160.

Determining (440) whether there are more targets may include proceeding down target records 300 to the next target. If there is another target, target placement method 400 loops back to determination operation 410. If there are no more targets, method 400 may terminate.

When a target does not meet the IOPs threshold or capacity threshold of a storage pool, target placement method 400 proceeds to determining (450) whether there are additional pools available. Destination 160 may report which storage pools, such as pools 170A-170C, are available. Target placement method 400 may proceed to the next highest-rated storage pool (see description of FIG. 5 for additional information). If there is at least one available storage pool, target placement method 400 loops back to determination operation 410. If there are no more pools available, method 400 proceeds to operation 460.

Updating (460) the list with no pool assignment may include updating target records 300 to reflect that the target was not able to be placed into a storage pool. When a target is unable to be placed into a storage pool, it may be placed into a default or predetermined storage location during the migration process.

Figure 5:
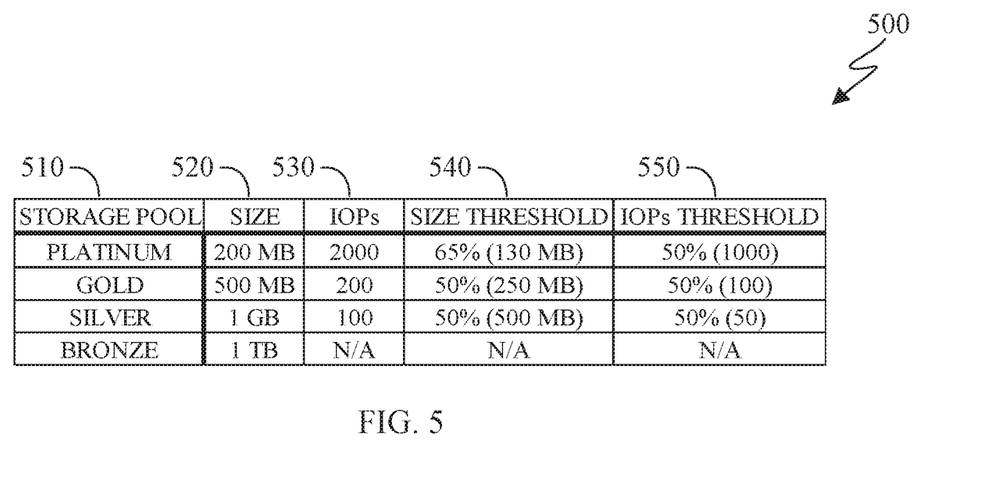
FIG. 5 is a table depicting an example of a pool configuration table in accordance with embodiments of the present invention.

FIG. 5 is a table depicting an example of a pool configuration table 500 in accordance with embodiments of the present invention. Pool configuration table 500 includes a listing of storage pools 510, along with the corresponding size 520, IOPs 530, size threshold 540, and IOPs threshold 550 of each storage pool. Pool configuration table 500 may be used by target placement method 400 in order to select a pool for a target.

Storage pools 510 may include a listing of pools by name or class in descending order. In some embodiments, the highest-rated pool is a "platinum" tier, followed by "gold," "silver," and "bronze." Pool size 520 may list the storage volume size of each pool, and IOPs 530 may list the IOPs that a pool is capable of delivering. Size threshold 540 may be a predetermined or selected fraction of the maximum size capacity, and similarly, IOPs threshold 550 may be a fraction of the maximum IOPs capability. A threshold may be used in order to ensure that the destination system's resources are never 100% utilized. In some embodiments, pool size 520, IOPs 530, size threshold 540, and/or IOPs threshold are updated to reflect the currently available storage and IOPs.

Figure 6:
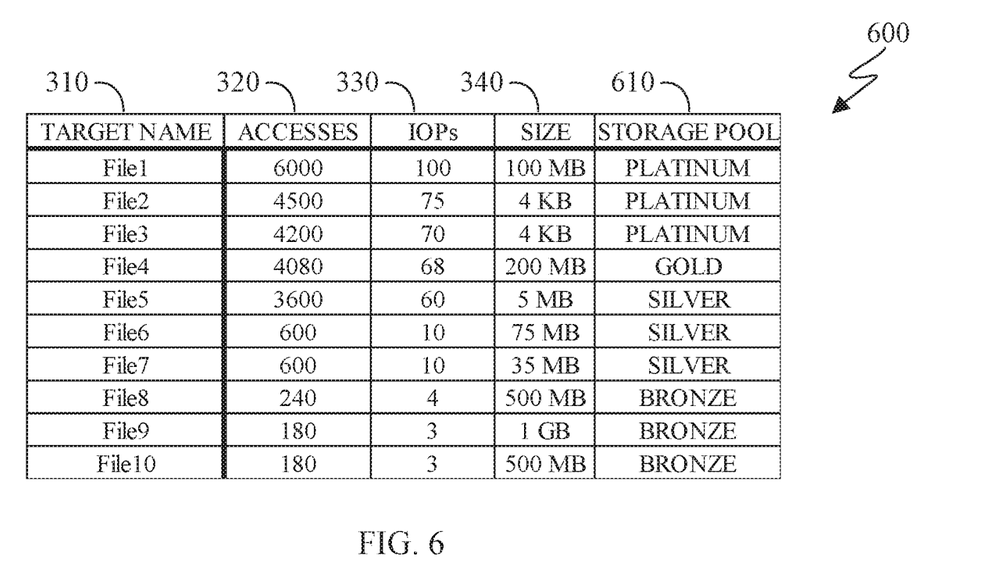
FIG. 6 is a table depicting an example of a pool assignment table in accordance with embodiments of the present invention.

FIG. 6 is a table depicting an example of a pool assignment table 600 in accordance with embodiments of the present invention. As depicted, pool assignment table 600 includes information from target records table 300 such as target name 310, number of accesses 320, IOPs 330, and size 340. Pool assignment table 600 further includes storage pool assignment 610. In some embodiments, pool assignment table 600 is target records table 300 with an updated pool assignment 610 field. Pool assignment table 600 may be generated by target placement method 400, and may be used during migration to determine the destination pool of a target.

Figure 7:
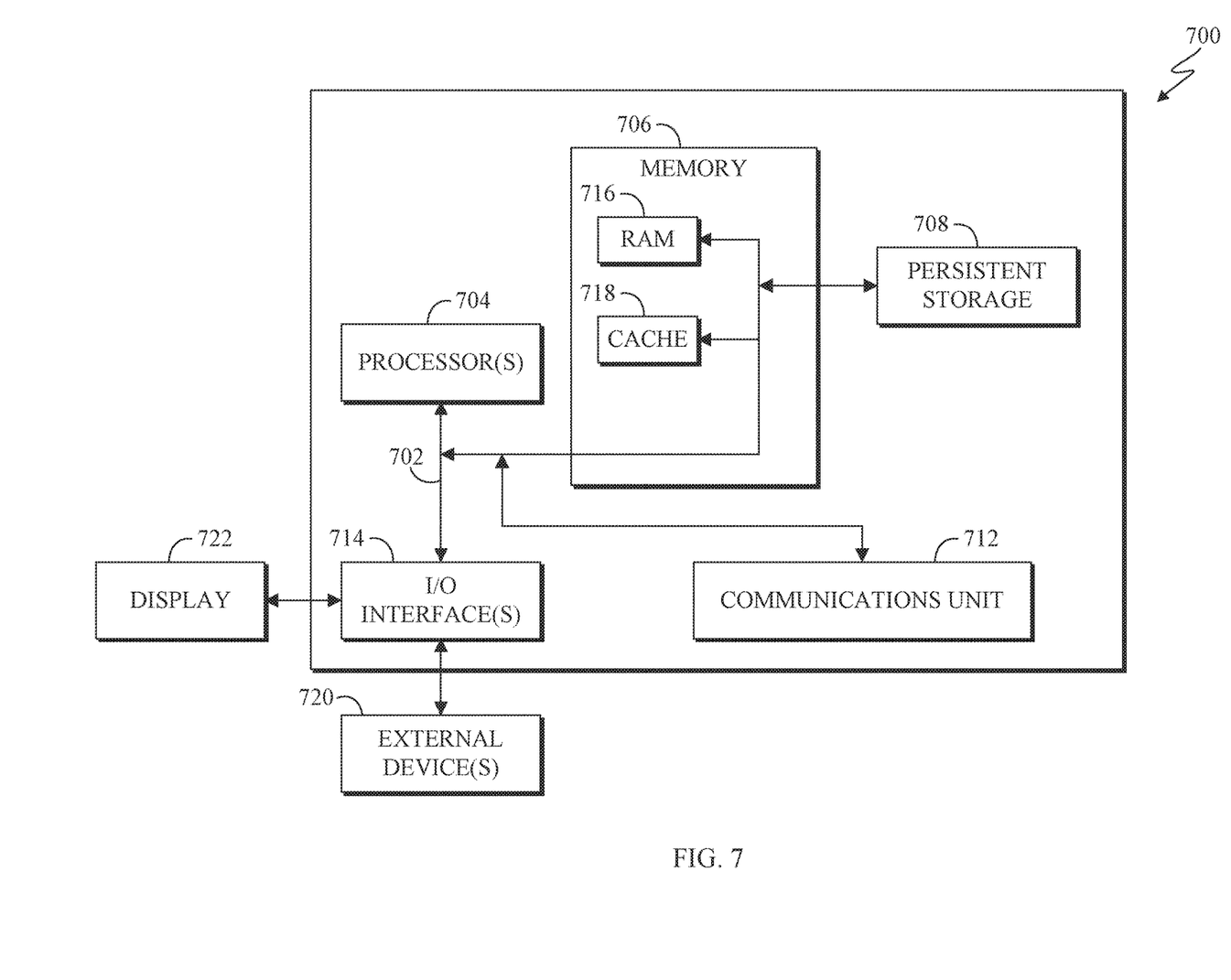
FIG. 7 is a block diagram depicting one example of a computing apparatus (i.e., computer) suitable for executing the methods disclosed herein.

FIG. 7 is a block diagram depicting components of a computer 700 suitable for executing the methods disclosed herein. It should be appreciated that FIG. 7 provides only an illustration of one embodiment and does not imply any limitations with regard to the environments in which different embodiments may be implemented. Many modifications to the depicted environment may be made.

As depicted, the computer 700 includes communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In the depicted embodiment, memory 706 includes random access memory (RAM) 716 and cache memory 718. In general, memory 706 can include any suitable volatile or non-volatile computer readable storage media.

One or more programs may be stored in persistent storage 708 for execution by one or more of the respective computer processors 704 via one or more memories of memory 706. The persistent storage 708 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 714 allows for input and output of data with other devices that may be connected to computer 700. For example, I/O interface 714 may provide a connection to external devices 720 such as a keyboard, keypad, a touch screen, and/or some other suitable input device. External devices 720 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 708 via I/O interface(s) 714. I/O interface(s) 714 may also connect to a display 722. Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for data migration, the method comprising:
   scanning an audit log corresponding to a data target of a plurality of data targets, wherein the scanning includes analyzing entries of the audit log one entry at a time, wherein the scanning further includes analyzing, in the entries, timestamps of when the data target is accessed, wherein the scanning further includes incrementing a count associated with the data target every time the data target is accessed, and wherein results of the scanning are output into a target record which identifies the data target and includes the count associated with the data target;
   determining an access metric, an input/output operations per second (IOPs) metric, and a size metric for each data target of the plurality of data targets, based on target records which identify each data target of the plurality of data targets and respective counts associated with each data target, wherein each data target of the plurality of data targets is tracked based on a number of access metric events and a data size of the respective data target;
   ranking the plurality of data targets according to the access metric of each data target; and
   assigning each data target to a storage pool of a plurality of storage pools according to the IOPs metric and the size metric of the respective data target, wherein each respective storage pool of the plurality of storage pools includes a performance specification of physical storage media of the respective storage pool, wherein each respective storage pool of the plurality of storage pools correlates to a particular tier of a tiered storage destination for storing the data targets based the size metrics and the IOPs metrics of the data targets, and wherein assigning each data target to the storage pool of a plurality of storage pools according to the IOPs metric and the size metric of the respective data target includes, for each respective data target:
   determining whether the IOPs metric of the respective data target meets an IOPs threshold of a respective storage pool of the plurality of storage pools;
   determining whether the size metric of the respective data target meets a storage capacity threshold of the respective storage pool;
   in response to determining that the IOPs metric and the size metric of the respective data target respectively meet the IOPs threshold and the storage capacity threshold for the respective storage pool, updating a stored list of the assigned data targets to identify the respective data target as being assigned to the respective storage pool; and
   determining whether there are additional data targets for assigning to storage pools of the plurality of storage pools.

2. The method of claim 1, further comprising copying each data target to its assigned storage pool.

3. The method of claim 1, wherein the plurality of data targets are assigned to the plurality of storage pools in an order corresponding to the ranking of the plurality of data targets.

4. The method of claim 1, further comprising ranking the plurality of data targets according to the size metric of each data target.

5. The method of claim 1, wherein each data target of the plurality of targets is selected from the list consisting of a file, a directory, an object and a container.

6. A computer system comprising:
   one or more computer processors;
   one or more computer readable storage media;
   program instructions stored therein for execution by at least one of the one or more computer processors, the program instructions comprising instructions for:
   scanning an audit log corresponding to a data target of a plurality of data targets, wherein the scanning includes analyzing entries of the audit log one entry at a time, wherein the scanning further includes analyzing, in the entries, timestamps of when the data target is accessed, wherein the scanning further includes incrementing a count associated with the data target every time the data target is accessed, and wherein results of the scanning are output into a target record which identifies the data target and includes the count associated with the data target;
   determining an access metric, an input/output operations per second (IOPs) metric, and a size metric for each data target of the plurality of data targets, based on target records which identify each data target of the plurality of data targets and respective counts associated with each data target, wherein each data target of the plurality of data targets is tracked based on a number of access metric events and a data size of the respective data target;
   ranking the plurality of data targets according to the access metric of each data target; and
   assigning each data target to a storage pool of a plurality of storage pools according to the IOPs metric and the size metric of the respective data target, wherein each respective storage pool of the plurality of storage pools includes a performance specification of physical storage media of the respective storage pool, wherein each respective storage pool of the plurality of storage pools correlates to a particular tier of a tiered storage destination for storing the data targets based the size metrics and the IOPs metrics of the data targets, and wherein assigning each data target to the storage pool of a plurality of storage pools according to the IOPs metric and the size metric of the respective data target includes, for each respective data target:
- determining whether the IOPs metric of the respective data target meets an IOPs threshold of a respective storage pool of the plurality of storage pools;
- determining whether the size metric of the respective data target meets a storage capacity threshold of the respective storage pool;
- in response to determining that the IOPs metric and the size metric of the respective data target respectively meet the IOPs threshold and the storage capacity threshold for the respective storage pool, updating a stored list of the assigned data targets to identify the respective data target as being assigned to the respective storage pool; and
- determining whether there are additional data targets for assigning to storage pools of the plurality of storage pools.

7. The computer system of claim 6, further comprising instructions for copying each data target to its assigned storage pool.

8. The computer system of claim 6, wherein the plurality of data targets are assigned to the plurality of storage pools in an order corresponding to the ranking of the plurality of data targets.

9. The computer system of claim 6, further comprising instructions for ranking the plurality of data targets according to the size metric of each data target.

10. The computer system of claim 6, wherein each data target of the plurality of targets is selected from the list consisting of a file, a directory, an object and a container.

11. A computer program product comprising:
a computer readable storage medium and program instructions stored on the computer readable storage medium, the program instructions comprising instructions for:
scanning an audit log corresponding to a data target of a plurality of data targets, wherein the scanning includes analyzing entries of the audit log one entry at a time, wherein the scanning further includes analyzing, in the entries, timestamps of when the data target is accessed, wherein the scanning further includes incrementing a count associated with the data target every time the data target is accessed, and wherein results of the scanning are output into a target record which identifies the data target and includes the count associated with the data target;
determining an access metric, an input/output operations per second (IOPs) metric, and a size metric for each data target of the plurality of data targets, based on target records which identify each data target of the plurality of data targets and respective counts associated with each data target, wherein each data target of the plurality of data targets is tracked based on a number of access metric events and a data size of the respective data target;
ranking the plurality of data targets according to the access metric of each data target; and
assigning each data target to a storage pool of a plurality of storage pools according to the IOPs metric and the size metric of the respective data target, wherein each respective storage pool of the plurality of storage pools includes a performance specification of physical storage media of the respective storage pool, wherein each respective storage pool of the plurality of storage pools correlates to a particular tier of a tiered storage destination for storing the data targets based the size metrics and the IOPs metrics of the data targets, and wherein assigning each data target to the storage pool of a plurality of storage pools according to the IOPs metric and the size metric of the respective data target includes, for each respective data target:
- determining whether the IOPs metric of the respective data target meets an IOPs threshold of a respective storage pool of the plurality of storage pools;
- determining whether the size metric of the respective data target meets a storage capacity threshold of the respective storage pool;
- in response to determining that the IOPs metric and the size metric of the respective data target respectively meet the IOPs threshold and the storage capacity threshold for the respective storage pool, updating a stored list of the assigned data targets to identify the respective data target as being assigned to the respective storage pool; and
- determining whether there are additional data targets for assigning to storage pools of the plurality of storage pools.

12. The computer program product of claim 11, further comprising instructions for copying each data target to its assigned storage pool.

13. The computer program product of claim 11, wherein the plurality of data targets are assigned to the plurality of storage pools in an order corresponding to the ranking of the plurality of data targets.

14. The computer program product of claim 11, wherein each data target of the plurality of targets is selected from the list consisting of a file, a directory, an object and a container.

* * * * *